| (12) United States Patent<br>Valluri et al. | (10) Patent No.: US 12,417,283 B2<br>(45) Date of Patent: Sep. 16, 2025 |
|---|---|

(54) IoT ADAPTIVE THREAT PREVENTION

(71) Applicant: Palo Alto Networks, Inc., Santa Clara, CA (US)

(72) Inventors: Vamsidhar Valluri, Los Gatos, CA (US); Jialiang Zhang, San Jose, CA (US); Shengming Xu, San Jose, CA (US); Arun Athrey Chandrasekaran, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 201 days.

(21) Appl. No.: 17/548,150

(22) Filed: Dec. 10, 2021

(65) Prior Publication Data

US 2023/0188540 A1 Jun. 15, 2023

(51) Int. Cl.
G06F 21/56 (2013.01)
G06F 21/55 (2013.01)
H04L 9/40 (2022.01)

(52) U.S. Cl.
CPC .......... *G06F 21/564* (2013.01); *H04L 63/145* (2013.01); *H04L 63/20* (2013.01); *G06F 21/552* (2013.01); *G06F 21/56* (2013.01)

(58) Field of Classification Search
CPC ... H04L 63/20; H04L 63/102; H04L 63/1416; H04L 63/0876; H04L 63/1425; H04L 63/1433; H04L 63/145; H04L 63/1408; H04L 12/2803–2838; H04L 67/12; H04W 12/122; H04W 12/128; G06F 21/552; G06F 21/554; G06F 21/56; G06F 21/57; G06F 21/564; G06F 21/562

See application file for complete search history.

(56) References Cited

U.S. PATENT DOCUMENTS

| 10,469,517 | B1* | 11/2019 | Higbee | H04L 63/1433 |
| 2010/0125897 | A1* | 5/2010 | Jain | H04L 63/0272 |
| | | | | 713/193 |
| 2013/0054795 | A1* | 2/2013 | Kang | H04L 65/612 |
| | | | | 709/224 |
| 2014/0137249 | A1* | 5/2014 | Johnson | G06F 21/564 |
| | | | | 726/23 |
| 2017/0048266 | A1* | 2/2017 | Hovor | H04L 63/1433 |
| 2017/0374555 | A1* | 12/2017 | RoyChowdhury | H04W 12/128 |
| 2021/0029153 | A1* | 1/2021 | Sugimoto | H04L 63/1441 |
| 2021/0029156 | A1* | 1/2021 | Sharifi Mehr | H04L 67/303 |
| 2021/0136100 | A1* | 5/2021 | Gupta | G06F 21/577 |

* cited by examiner

*Primary Examiner* — Benjamin E Lanier
*Assistant Examiner* — Brandon Binczak
(74) *Attorney, Agent, or Firm* — Van Pelt, Yi & James LLP

(57) ABSTRACT

IoT adaptive threat prevention is disclosed. Network traffic received at a security platform is monitored to detect a plurality of IoT device profiles based on the monitored network traffic. A set of signatures for the security platform is received based on the detected plurality of IoT device profiles.

12 Claims, 10 Drawing Sheets

DTSM Table

| Category | Profile | SigId | SigTags |
|---|---|---|---|
| InfusionSystem | Alaris-8100 | Sig-2-24001, Sig-2-24021 | IS, IS-Alaris-8100 |
| InfusionSystem | Hospira-Plum | Sig-2-27061 | IS, IS-Hospira-plum |
| Patient Monitoring System | GE-B105 | Sig-5-31200 | PMS, PMS-GE-B105 |

FIG. 3C

EXAMPLE OF A TRAFFIC LOG FOR AN IOT DEVICE

```
"eal_json": {
    "dhcp-req-msg-type": 1,
    "dhcp-req-transaction-id": 1512955488,
    "dhcp-req-opcode": 1,
    "dhcp-req-siaddr": "00000000000000000000ffff00000000",
    "dhcp-req-vendor-class": "WingAP.AP8132",
    "dhcp-req-yiaddr": "00000000000000000000ffff00000000",
    "dhcp-req-host-name": "0554-GC03",
    "dhcp-req-giaddr": "00000000000000000000ffff0a08aa3e",
    "dhcp-req-chaddr": "84:24:8d:66:21:10",
    "dhcp-req-ciaddr": "00000000000000000000ffff00000000"}
```

FIG. 3D

IoT ADAPTIVE THREAT PREVENTION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer and can perform additional nefarious tasks (e.g., exfiltrating sensitive data, propagating to other systems, etc.). A variety of approaches can be used to harden computers against such and other compromises. Unfortunately, existing approaches to protecting computers are not necessarily suitable in all computing environments. Further, malware authors continually adapt their techniques to evade detection, and an ongoing need exists for improved techniques to detect malware and prevent its harm in a variety of situations.

BRIEF DESCRIPTION OF THE DRAWINGS

Various embodiments of the invention are disclosed in the following detailed description and the accompanying drawings.

FIG. 3C is an example of a device threat signature mapping table.

FIG. 3D is an example of a log generated by a firewall connected to a corporate network including IoT devices.

DETAILED DESCRIPTION

Figure 1:
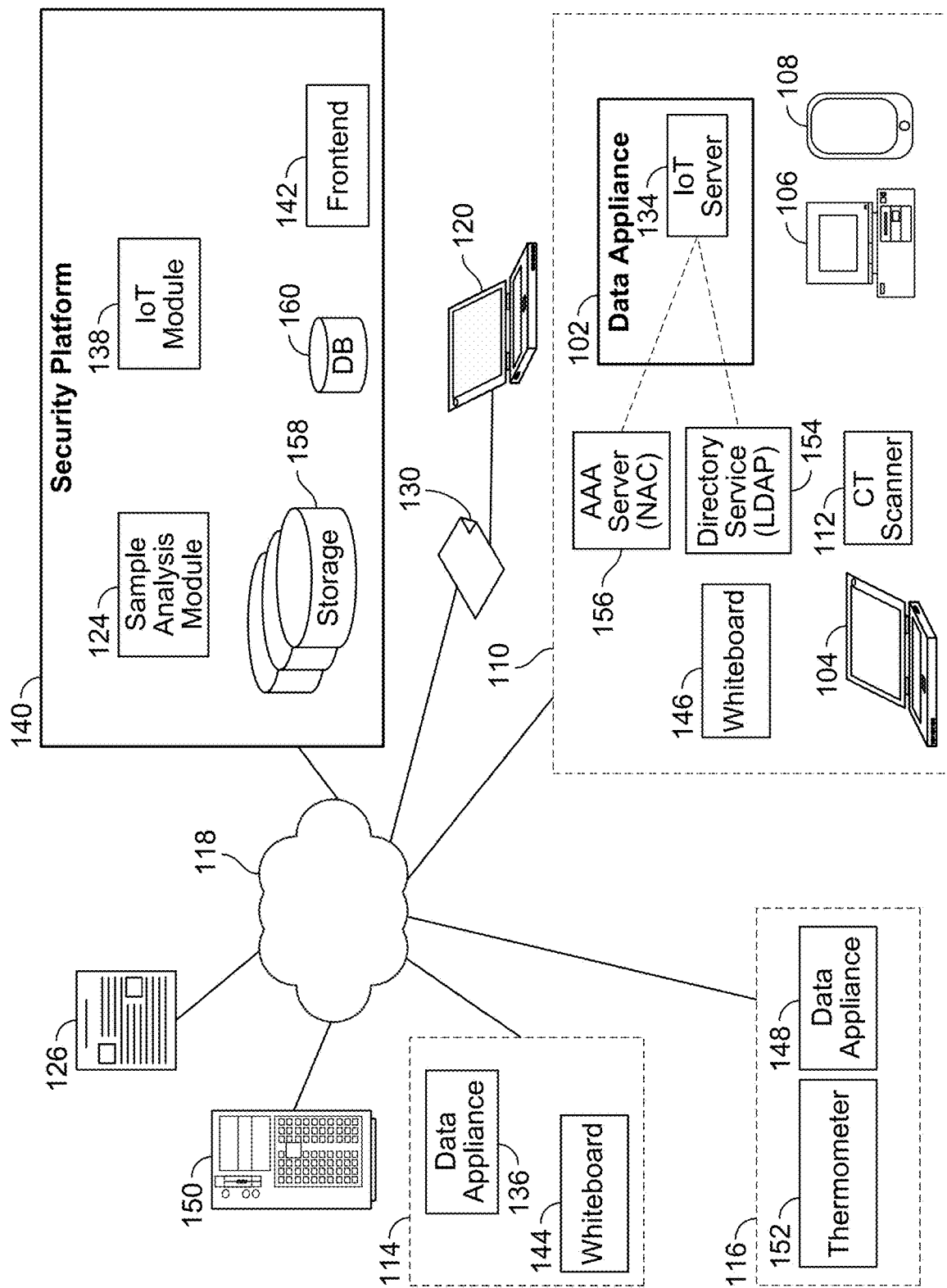
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network security devices, such as firewalls, contain threat signatures for analyzing network traffic. In the event that a network security device determines that the network traffic matches a threat signature, the network security device can provide the customer with an alert to indicate that the network traffic includes a potential threat and perform actions to neutralize the potential threat.

With the explosion of Internet of Things (IoT) devices, corporations have a desire to identify IoT devices on their networks and protect their corporate network against vulnerabilities associated with the IoT devices on their corporate network. One way to protect their corporate network is to download, onto their network security devices, threat signatures associated with the IoT devices on their corporate network. However, because IoT devices are proliferating rapidly, network security devices cannot download and store every threat signature for all of the possible IoT devices. There needs to be an intelligent way to automatically download threat signatures associated with the IoT devices on a corporate network.

In some embodiments, a system/method/computer program product for preventing an IoT adaptive threat includes monitoring network traffic received at a security platform to detect a plurality of IoT device profiles; and receiving a set of signatures for the security platform based on the detected plurality of IoT device profiles.

In some embodiments, the system/method/computer program product for preventing an IoT adaptive threat further includes enforcing at least one signature of the set of signatures at the security platform.

In some embodiments, each signature of the set of signatures is mapped to a corresponding IoT device profile.

In some embodiments, the system/method/computer program product for preventing an IoT adaptive threat further includes storing a set of vulnerabilities associated with each IoT device profile of the plurality of IoT device profiles in a device threat signature matching data store.

In some embodiments, the set of signatures includes signatures for one or more vulnerabilities associated with each IoT device profile of the plurality of IoT device profiles.

In some embodiments, the system/method/computer program product for preventing an IoT adaptive threat further includes determining a difference of signatures already deployed at the security platform and a set of signatures associated with the plurality of IoT device profiles; and adding the difference to the security platform.

In some embodiments, the system/method/computer program product for preventing an IoT adaptive threat further includes associating a signature tag with an IoT device profile of the plurality of IoT device profiles.

In some embodiments, the system/method/computer program product for preventing an IoT adaptive threat further includes subscribing, via the security platform, to one or more tag subscriptions corresponding to one or more signature tags based on the detected plurality of IoT device profiles.

In some embodiments, an IoT device profile includes: a device category, a device manufacturer, and a device model.

In some embodiments, the system/method/computer program product for preventing an IoT adaptive threat further includes sending an indication to the security platform to remove a signature based on a set of policies.

In some embodiments, the sending of the indication to the security platform to remove a signature based on a set of policies comprises: determining, using the monitored network traffic, whether an amount of time that a device profile has not been detected within the monitored network traffic is equal to or exceeds a time threshold; and in the event that the amount of time that the device profile has not been detected within the monitored network traffic is equal to or exceeds the time threshold, sending an indication to the security platform to remove a signature.

In some embodiments, the system/method/computer program product for preventing an IoT adaptive threat further includes adding a signature for the security platform.

In some embodiments, the adding of the signature for the security platform comprises: detecting a new device profile based on the monitored network traffic; determining a new vulnerability associated with the new device profile; and adding a signature corresponding with the new vulnerability to the security platform.

In some embodiments, the adding of the signature for the security platform comprises: determining that a newly identified vulnerability associated with an existing device profile exists; and adding a new signature corresponding to the newly identified vulnerability to the security platform.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based system, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes use of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote security platform 140. Security platform 140 can provide a variety of services, including performing static and dynamic analysis on malware samples (e.g., via sample analysis module 124), and providing a list of signatures of known-malicious files, domains, etc., to data appliances, such as data appliance 102 as part of a subscription. As will be described in more detail below, security platform 140 can also provide information (e.g., via IoT module 138) associated with the discovery, classification, management, etc., of IoT devices present within a network such as network 110. In various embodiments, signatures, results of analysis, and/or additional information (e.g., pertaining to samples, applications, domains, etc.) is stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives or other storage 158, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As examples, security platform 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
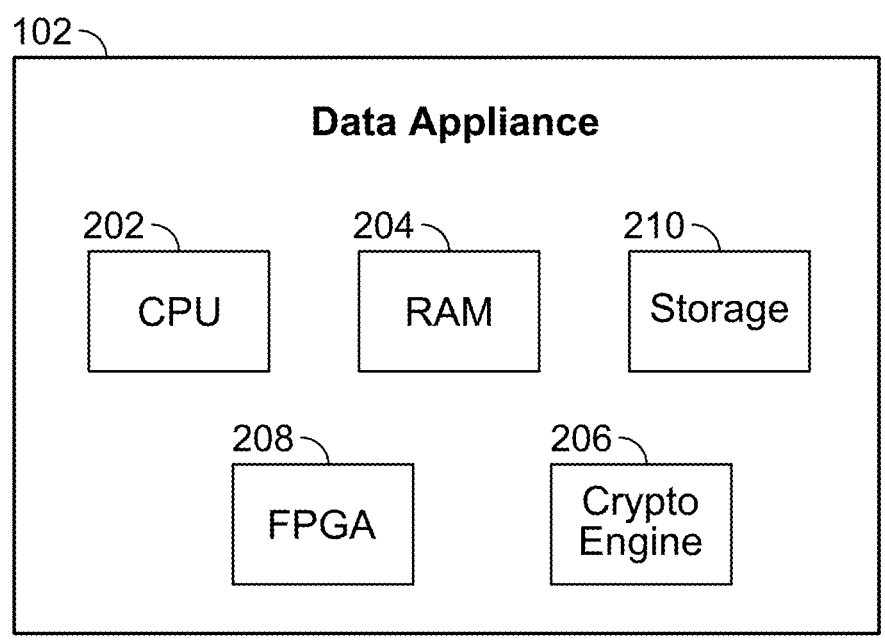
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 is instead (or in addition) provided to a client device (e.g., client device 104 or client device 106) by software executing on the client device. Functionality described herein as being performed by data appliance 102 can also be performed at least partially by or in cooperation with security platform 140, and/or functionality described herein as being performed by security platform 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on. Another example of a component included in data appliance 102 in various embodiments is an IoT server 134, described in more detail below. IoT server 134 can take a variety of forms, including as a standalone server (or set of servers), whether physical or virtualized, and can also be collocated with/incorporated into data appliance 102 as applicable (e.g., as shown in FIG. 1).

Figure 2B:
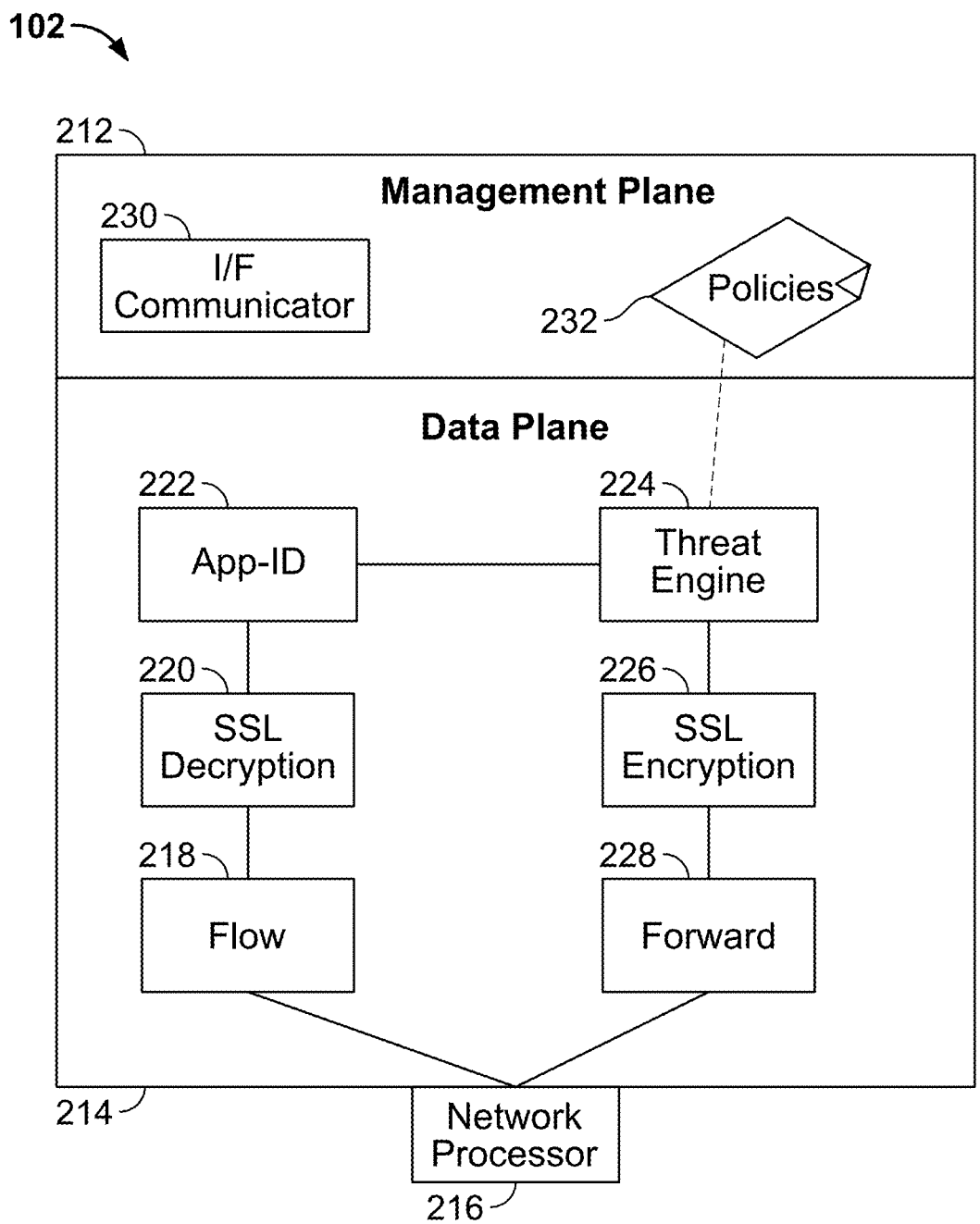
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 212 and a data plane 214. The management plane is responsible for managing user interactions, such as by providing a user interface for configuring policies and viewing log data. The data plane is responsible for managing data, such as by performing packet processing and session handling.

Network processor 216 is configured to receive packets from client devices, such as client device 108, and provide them to data plane 214 for processing. Whenever flow module 218 identifies packets as being part of a new session, it creates a new session flow. Subsequent packets will be identified as belonging to the session based on a flow lookup. If applicable, SSL decryption is applied by SSL decryption engine 220. Otherwise, processing by SSL decryption engine 220 is omitted. Decryption engine 220 can help data appliance 102 inspect and control SSL/TLS and SSH encrypted traffic, and thus help to stop threats that might otherwise remain hidden in encrypted traffic. Decryption engine 220 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 222 is configured to determine what type of traffic a session involves. As one example, application identification engine 222 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 222, the packets are sent, by threat engine 224, to an appropriate decoder configured to assemble packets (which may be received out of order) into the correct order, perform tokenization, and extract out information. Threat engine 224 also performs signature matching to determine what should happen to the packet. As needed, SSL encryption engine 226 can re-encrypt decrypted data. Packets are forwarded using a forward module 228 for transmission (e.g., to a destination).

As also shown in FIG. 2B, policies 232 are received and stored in management plane 212. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 230 is provided for management communications (e.g., via (REST) APIs, messages, or network protocol communications or other communication mechanisms). Policies 232 can also include policies for managing communications involving IoT devices.

III. Iot Device Discovery and Identification

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144 and 146). Such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer-oriented IoT devices (e.g., cameras) may also be present in an enterprise network. As with commodity computing devices, IoT devices present within a network may communicate with resources that are both internal or external to such networks (or both, as applicable).

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152 communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved, and the harms posed to such networks can be reduced.

In various embodiments, data appliance 102 includes an IoT server 134. IoT server 134 is configured to identify IoT devices within a network (e.g., network 110), in some embodiments, in cooperation with IoT module 138 of security platform 140. In some embodiments, data appliances such as data appliance 136 is configured to identify IoT devices within a network 114 and data appliance 148 is configured to identify IoT devices within a network 116. Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

In various embodiments, IoT server 134 is configured to provide log or other data (e.g., collected from passively monitoring network 110) to IoT module 138 (e.g., via frontend 142).

Figure 3A:
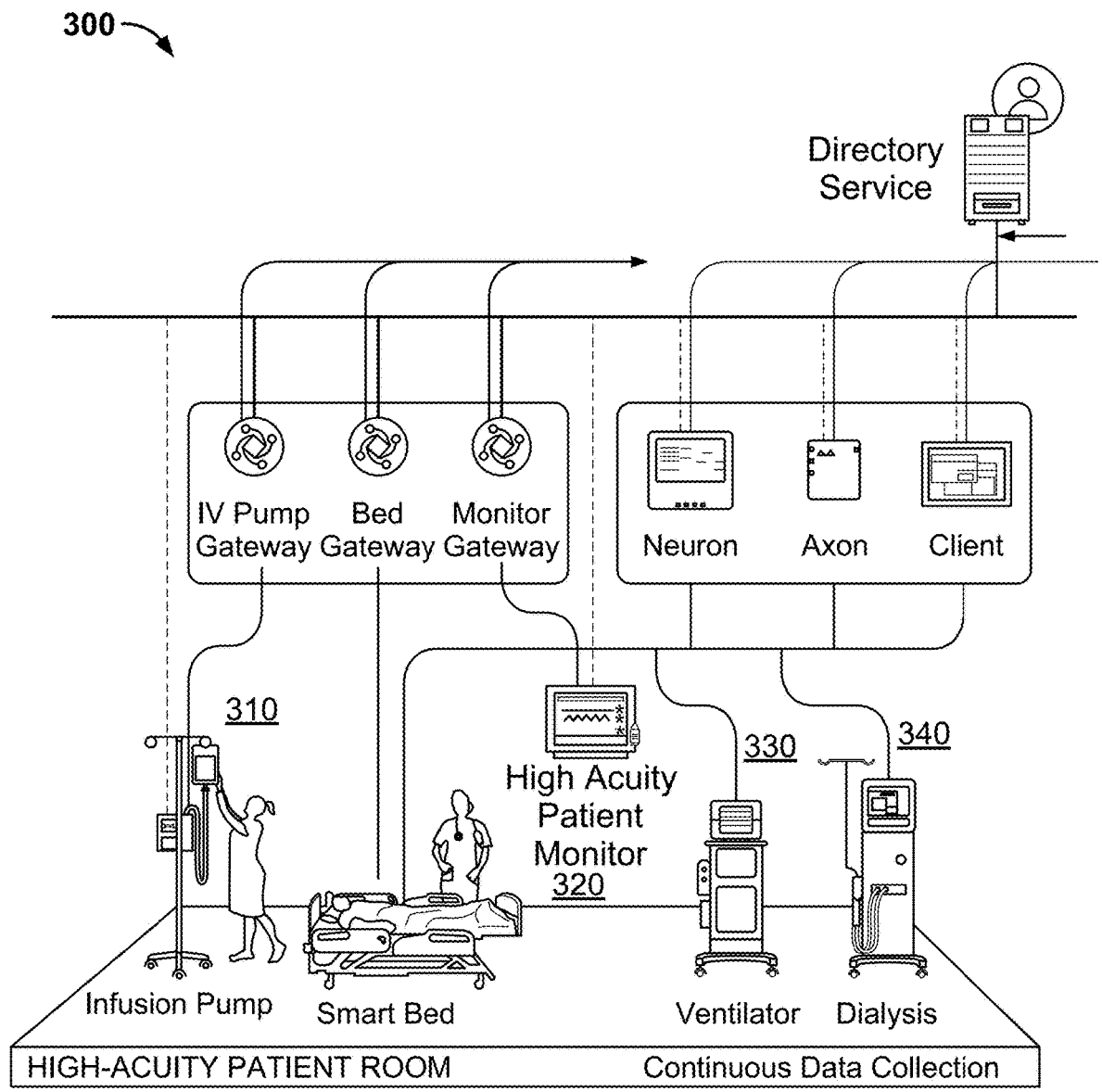
FIG. 3A is a diagram illustrating an example of a corporate network including Internet of Things devices.

FIG. 3A is a diagram illustrating an example of a corporate network including Internet of Things devices.

In the example, the corporate network 300 is implemented in a healthcare environment. Other environments include high tech environments, power plant environments, natural gas environments, retail environments, warehouse environments, manufacturing plants, smart buildings, etc. In the example, the healthcare environment includes the following Internet of Things (IoT) devices: an infusion pump 310, a smart bed 320, a ventilator 330, and a dialysis 340. Each IoT device on the corporate network accesses an application service via a firewall or network security device. The network traffic from the IoT devices passes through the firewall, which monitors the network traffic for patterns or signatures indicating that a malicious threat exists. Also, the firewall collects data and generates logs that are sent to an IoT cloud for further analysis.

Figure 3B:
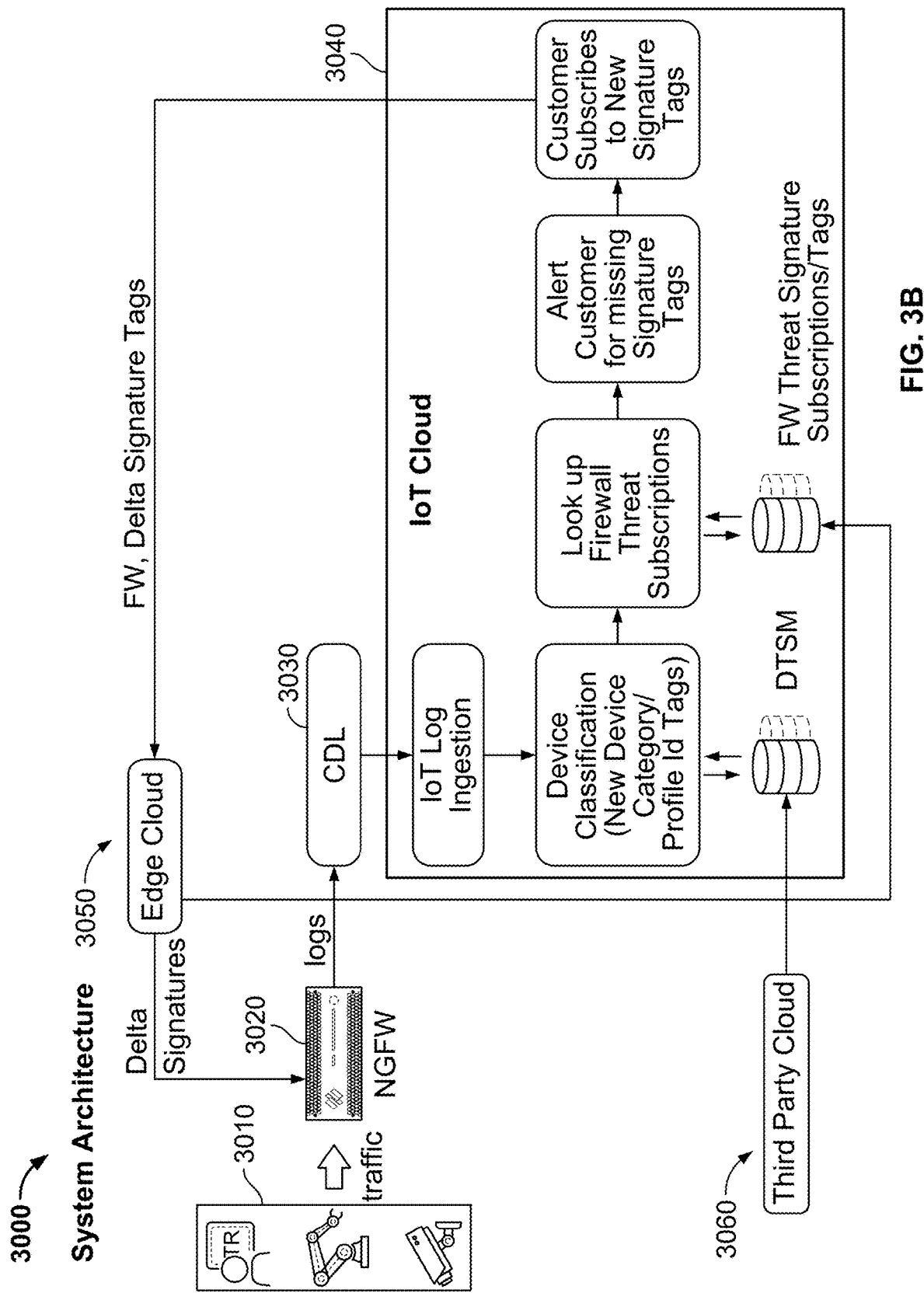
FIG. 3B is a diagram illustrating an example of a system architecture for preventing an IoT adaptive threat.

FIG. 3B is a diagram illustrating an example of a system architecture for preventing an IoT adaptive threat.

In the system architecture 3000, IoT devices 3010 send traffic through a firewall or a next generation firewall (NGFW) 3020. The firewall 3020 stores network traffic data in a log and periodically forwards the traffic log to a cortext data lake (CDL) 3030. The CDL 3030 receives the traffic log from the firewall 3020 and stores the received traffic log. The IoT Cloud 3040 ingests stored traffic logs from the CDL 3030 for further analysis.

In some embodiments, the IoT Cloud 3040 analyzes the traffic logs to identify various devices on the network. In some embodiments, the identified devices relates to IoT devices, for example, the IoT devices include an infusion pump 310, a smart bed 320, a ventilator 330, and a dialysis 340, as shown in FIG. 3A. Referring back to FIG. 3B, using rules based and machine learning based, the various IoT devices are identified from the traffic logs based on their MAC addresses, Application IDs, destination IP addresses, and metadata. Examples of metadata used for device identification include dhcp option 55, dhcp option 60, and user agent. Examples of match rules for the metadata include: "dhcp_option_55: 1,121,3,6,15,119,252,95,44,46", "dhcp_option_60: /^AAPLBSDPC\/i386\/Macmini.*/," and "user_agent: /. *Apple Mac OS X. */." Examples of application ID include ge_ecg_serial and pdl_data_stream. After various IoT devices are identified on the network, vulnerabilities or threats associated with the IoT devices are identified. In some embodiments, threats are determined based on signatures or patterns found in the network traffic. For example, if a surveillance camera (IoT device) is detected on the network, known vulnerabilities and/or known threats associated with the surveillance camera are determined based on profile, category, vertical, vendor, model, and software loaded on the detected surveillance camera. In some embodiments, the customer and/or network manager is also alerted about the known vulnerabilities and/or the known threats associated with surveillance cameras. Examples of alerts include a recommendation to add a software patch to a server or network device to correct a known vulnerability, a recommendation to add a rule to block a type of network traffic to an application service, a recommendation to add a policy to a network security device to restrict access to an application server, etc. In some embodiments, the IoT device type is mapped with a corresponding IoT device profile in an internal database.

Ideally, all of the network security devices on a corporate network should have loaded all the various signatures of all of the various IoT devices, but there are too many IoT device signatures for a network security device to handle. There are thousands of common vulnerabilities and exposure (CVE) identified and corresponding signatures available. The present application provides a mechanism to intelligently download a subset of all IoT device signatures to still fully protect a corporate network. In some embodiments, the present application downloads all of the IoT device signatures that are associated with a specific category. For example, IoT device signatures that are associated with an infusion pump or security camera are downloaded onto the network security device. In another example, IoT device signatures are associated with a category associated with a specific infusion pump or a specific security camera are downloaded onto the network security device.

For example, the logs are analyzed for new IoT devices on the corporate network, and when a new IoT device is identified on the corporate network, CVEs associated with the newly identified IoT device are identified. Signatures associated with the CVEs are identified and downloaded onto the network security devices to protect the corporate network. In some embodiments, CVEs associated with the category related to the newly identified IoT device are identified, and signatures associated with the CVEs are identified and downloaded onto the network security devices.

In some embodiments, a device threat signature mapping (DTSM) table is used to identify the signatures associated with an IoT device. For example, after an IoT device is identified, such as an infusion system made by General Electric™ (GE) having a Model B105, signatures associated with the GE infusion system model B105 are identified and signatures associated with the category of infusion systems are identified using the DTSM table. In some embodiments, based on the IoT devices identified on a corporate network, a vertical, e.g., healthcare, power plant, Oil Company, etc., can be determined and all of the signatures associated with a vertical can be downloaded onto a network security device.

As to be later discussed, after the device is identified, a tagging technique can be applied to the deployed signatures associated with the identified device so that when additional relevant signatures are newly discovered, those new signatures can be deployed onto the network security device. The new signatures can relate to a new device or a new threat. By being tagged, any new signature related to the tagged IoT device can automatically be deployed onto the network security device.

For example, assume that a Cisco Meraki™ security camera has been newly detected on a network. The categories of security camera and Cisco Meraki™ security camera can be tagged. The DTSM table can be queried to identify signatures associated with the security camera and the Cisco Meraki™ security camera, and the identified signatures can be deployed onto the network security device.

In some embodiments, after a new IoT device is detected on a network, based on a query to the DTSM table, a category associated with the newly identified device is determined. Using the example that a Cisco Meraki™ security camera was newly identified, the categories of the security camera and the Cisco Meraki™ security camera can be tagged and signatures associated with the tagged signature categories can be downloaded onto the network security device. For example, signatures associated with security cameras made by manufacturers other than Cisco Meraki™ as well as signatures associated with Cisco Meraki™ security cameras are downloaded onto the network security device. In some embodiments, before downloading the signatures, the customer is alerted for approval to download the additional signatures for the security cameras. In some embodiments, before being downloaded onto the network security device, an edge cloud 3050 is queried to determine whether any of those signatures to be downloaded already exist on the network security device. In some embodiments, the edge cloud 3050 stores the DTSM table.

In some embodiments, when a set of new signatures is about to be deployed onto the network security device, the firewall signature database is queried to determine whether any signature of the set of new signatures is already deployed onto the network security device, and signatures of the set of new signatures already loaded onto the network security device are identified, those identified signatures are removed from the set of new signatures, and the remaining signatures of the set of new signatures are deployed onto the network security device. In some embodiments, the set of new signatures is obtained from a third party cloud 3060 that is managed by a third party (e.g., a Security Vendor).

New signatures can be discovered for existing IoT devices. Since new threats appear all the time for various IoT devices, when a new threat is identified, a new signature is developed to detect the new threat. Accordingly, when a new signature is developed for an existing IoT device, the IoT cloud checks the firewall signature database to determine whether a corresponding signature tag exists for the existing IoT device, and in the event that a corresponding signature tag exists for the existing IoT device, the new signature for the existing IoT device is deployed to the network security device. In some embodiments, before the new signature is deployed, the customer is first alerted that a new signature exists for an existing device, and the customer authorizes the IoT cloud to deploy the new signature to the network security device. In some embodiments, the new signature for the existing IoT device is checked against the firewall signature database to determine whether the new signature for the existing IoT device is already loaded onto the network security device, and if it is already loaded, the new signature is not deployed to the network security device.

In some embodiments, the signatures deployed on the network security device are kept up to date. For example, the logs are analyzed to see whether network traffic associated with an IoT device (e.g., a Cisco Meraki™ security camera) connected to the network is no longer detected. In the event that network traffic associated with an IoT device connected to the network is no longer detected, the profile associated with the IoT device is marked as inactive in a device profile list. In some embodiments, in the event that the network traffic associated with an IoT device connected to the network is no longer detected for a period of time threshold (e.g., one month, one year, etc.), the profile associated with the IoT device is removed from the device profile list unless there are other similar active IoT devices. In other words, after all the devices belonging to all the profiles in a category are marked as inactive, signatures for devices associated with the category are removed after devices belonging to the category are no longer detected for a period of time.

FIG. 3C is an example of a device threat signature mapping table. In the example, the device threat signature mapping (DTSM) table includes four columns including category, profile, signature identifier (SigId), and signature tags (SigTags). In this example, the categories include InfusionSystem and Patient Monitoring System, the profiles include Alaris-8100, Hospira-Plum, and GE-B105, the SigIds include Sig-2-24001, Sig-2-24021, Sig-2-27061, and Sig-5-31200, and the SigTags include IS, IS-Alaris-8100, IS, IS-Hospira-Plum, PMS, and PMS-GE-B105. In some embodiments, the category refers to a category corresponding to an IoT device. In some embodiments, the profile refers to a profile associated with an IoT device. In some embodiments, a specific profile refers to a specific make and a specific model. In some embodiments, the SigId refers to a signature that addresses a threat for a particular IoT device. Each IoT device can have multiple signatures because a specific IoT device can have multiple threats. In some embodiments, a SigTag refers to a signature tag associated with a device having a specific manufacturer and model, so when additional signatures are available for the device having a specific manufacturer and model. As an example, an administrator can be subscribed to a specific tag and notified when additional signatures for a specific manufacturer and model are available to be pushed onto the network security device. In some embodiments, the IoT Device profile includes a device category, a device manufacturer, and a device model.

FIG. 3D is an example of a log generated by a firewall connected to a corporate network including IoT devices.

As an example, FIG. 3D includes a log of an IoT device communicating with a DHCP server. From the log and other such logs, the IoT device can be determined to be an Extreme Network™ Wireless Access Point WiNG AP 8132.

Figure 4:
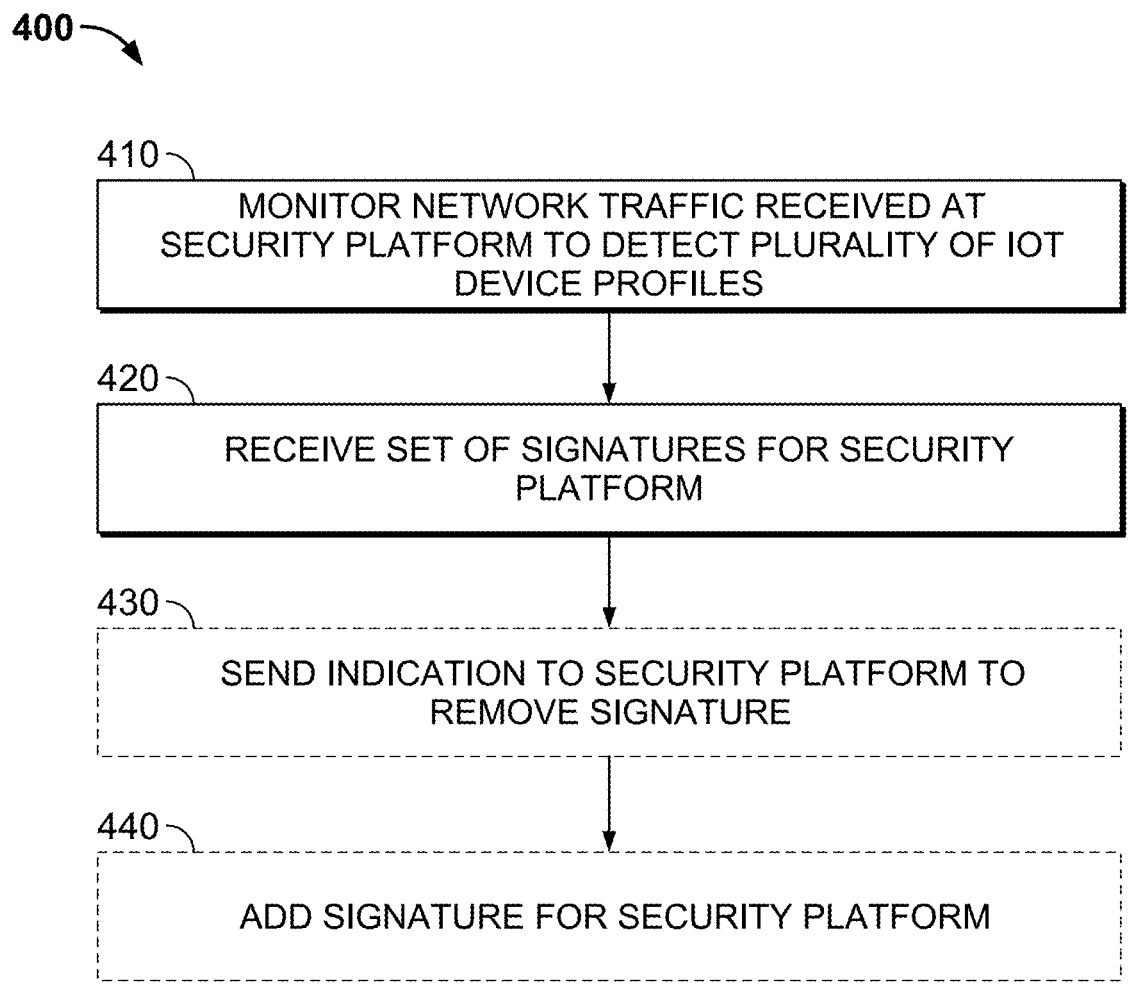
FIG. 4 illustrates an embodiment of a process for preventing an IoT adaptive threat.

FIG. 4 illustrates an embodiment of a process for preventing an IoT adaptive threat. In some embodiments, the process 400 is implemented by an IoT cloud 3040 of FIG. 3B and comprises:

In 410, the IoT cloud monitors network traffic received at a security platform to detect a plurality of IoT device profiles.

In some embodiments, the IoT cloud analyzes a traffic log ingested from the security platform (or network security device), and based on specific traffic patterns (or IoT device signature), the IoT cloud can identify an IoT device profile. The specific traffic patterns can include an ordered sequence of network events including: destination hostname or destination IP address, port number, protocol, or any combination thereof. As an example, the IoT device Ingenico Point of Sale (POS) model iCT250 uses HTTP to communicate with a POS server. In an HTTP packet from the IoT device, the HTTP packet has information in the HTTP context <transaction interface="IngenicoPW" client="iCT250">. The transaction interface and the client can be used as a signature to identify the IoT device as an Ingenico POS device. In another example, an IoT device Temptrak is identified. The IoT device Temptrak can be identified using port 44005 and a signature sequence of bytes in the payload. For example, the signature sequence of bytes includes the first 10 bytes in the payload 0x12 0x0a 0x03 0x01 0x00 0xd2 0x82 0x92 0x96 0x97.

In 420, the IoT cloud receives a set of signatures for the security platform based on the detected plurality of IoT device profiles.

In some embodiments, after the IoT device profiles have been detected from the traffic logs, threats or CVEs corresponding to the IoT device profiles are obtained and signatures associated with the threats or CVEs are deployed onto the security platform. In some embodiments, a category associated with an IoT device profile is also determined. For example, in the event that a Cisco Meraki™ security camera is detected on the network, signatures associated with the security camera vertical are obtained and deployed onto the security platform. Signatures associated with the security camera vertical can include security cameras from Cisco Meraki™ as well as other brands.

Optionally, in 430, the IoT Cloud sends an indication to the security platform to remove a signature based on a set of policies.

In some embodiments, in the event that a device is not found within the traffic log, the device profile associated with the device is marked as inactive in a customer tenant specific device inventory table (CTSDIT). In some embodiments, in the event that a device profile is not found within the traffic log for a period of time (e.g., one month, six months, one year, etc.), the IoT Cloud sends an indication to the security platform to remove a signature, and the device profile has been removed from the CTSDIT Table. In some embodiments, before the device profile is removed from the security platform, the IoT device has already been marked as inactive in the CTSDIT Table. In some embodiments, before an IoT device is to be marked inactive or removed, the customer is alerted that the IoT device is not found on the network and grants authorization to inactivate or removes the IoT device from the database. In some embodiments, an IoT device will be automatically marked inactive if the IoT device is not found on the network, and based on inactivity timeout (the inactive period of time) and customer authorization, signatures associated with the inactive IoT device can automatically be removed.

Optionally, in 440, the IoT Cloud adds a signature for the security platform. In some embodiments, the IoT Cloud adds a signature for the security platform corresponding to a newly detected device profile. In some embodiments, the IoT Cloud adds a signature for the security platform corresponding with a newly identified threat associated with an existing device profile.

In some embodiments, before adding the new signature, the IoT cloud alerts the customer that the new signature has been identified, and requests authorization to deploy the new signature to the security platform.

Figure 5:
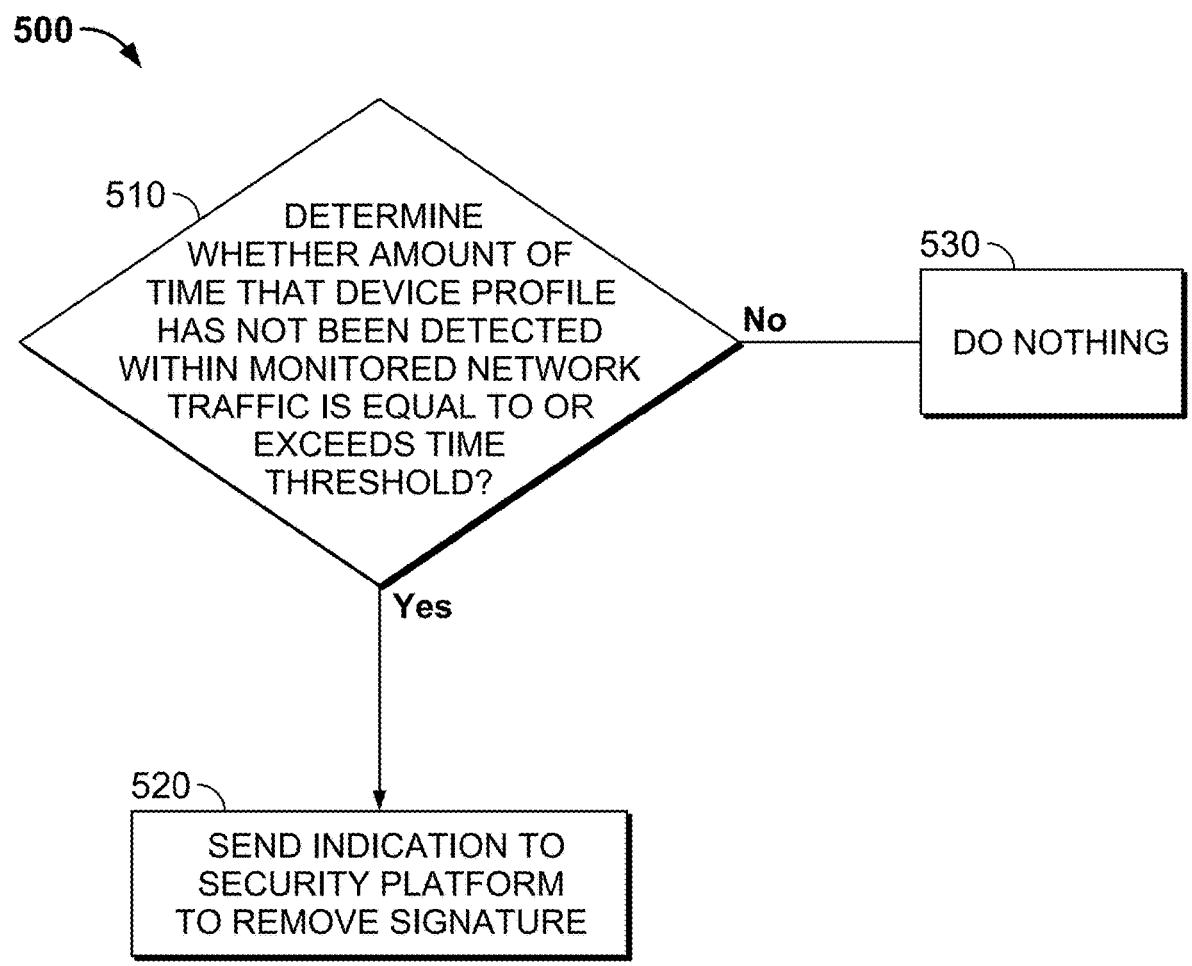
FIG. 5 illustrates an embodiment of a process for sending an indication to the security platform to remove a signature based on a set of policies.

FIG. 5 illustrates an embodiment of a process for sending an indication to the security platform to remove a signature based on a set of policies. In some embodiments, process 500 is an implementation of operation 430 of FIG. 4 and comprises:

In 510, the IoT cloud determines whether an amount of time that a device profile has not been detected within the network traffic is equal to or exceeds a time threshold.

In 520, in the event that the amount of time that the device profile has not been detected within the network traffic is equal to or exceeds the time threshold, the IoT cloud sends an indication to the security platform to remove a signature.

In 530, in the event that the amount of time that the device profile has been detected within the network traffic is equal to or exceeds the time threshold, the IoT cloud does not do anything.

In some embodiments, the IoT cloud also removes the device profile from the firewall signature database. In some embodiments, the device profile is removed only after being authorized by the customer.

Figure 6:
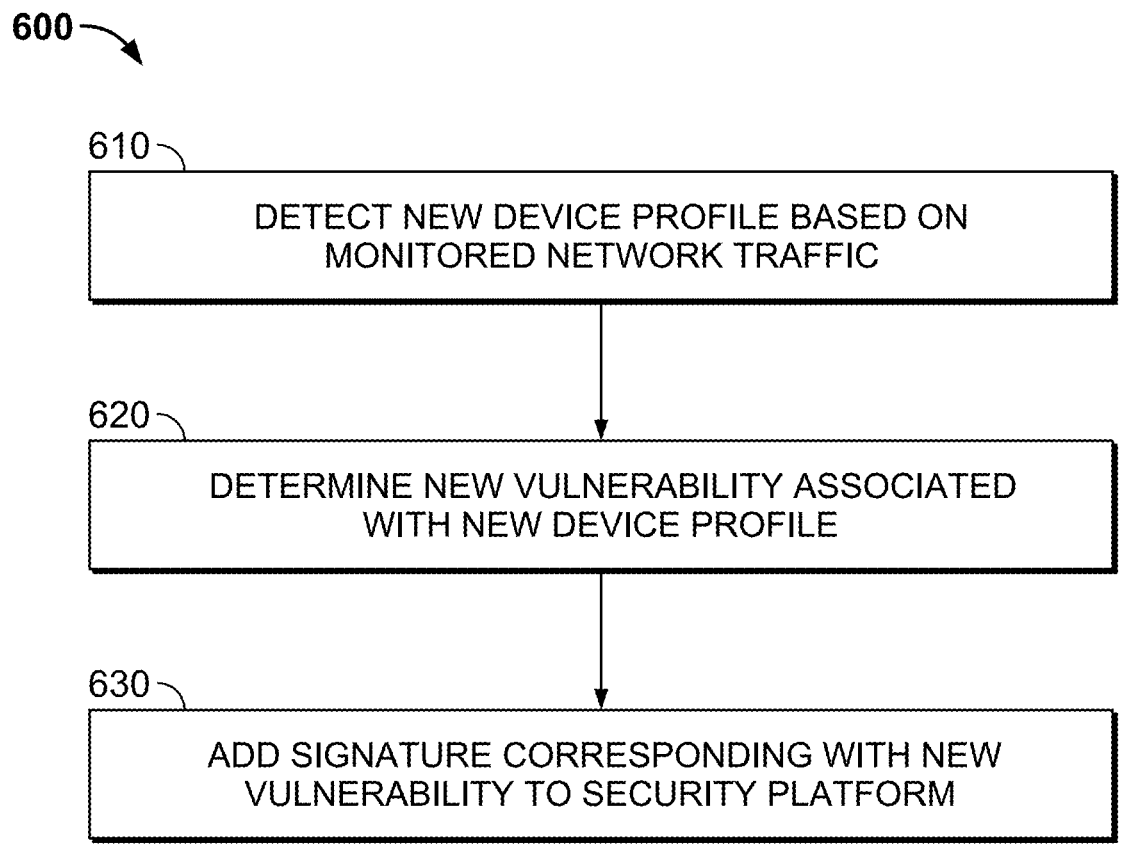
FIG. 6 illustrates an embodiment of a process for adding a signature for a security platform.

FIG. 6 illustrates an embodiment of a process for adding a signature for a security platform. In some embodiments, process 600 is an implementation of operation 440 of FIG. 4 and comprises:

In 610, the IoT cloud detects a new device profile based on the monitored network traffic.

In some embodiments, new devices are regularly added to the corporate network, and in the event that a new device is detected on the corporate network from traffic logs, the IoT cloud identifies a new device profile associated with the new device.

In 620, the IoT cloud determines a new vulnerability associated with the new device profile. In some embodiments, the IoT cloud determines a category associated with the new device profile, and identifies vulnerabilities associated with the category.

Figure 7:
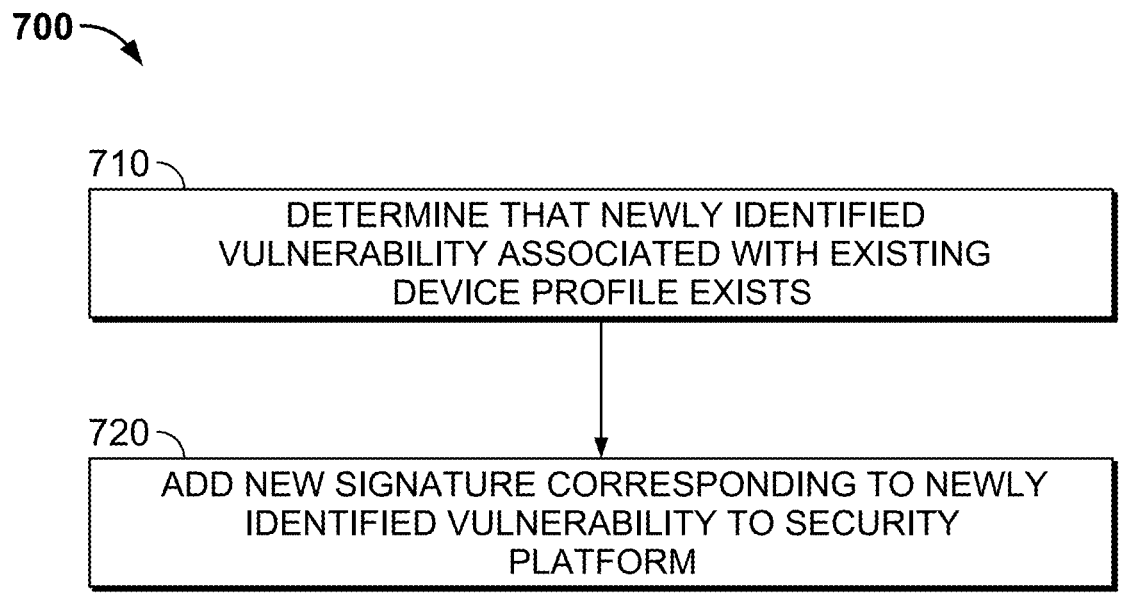
FIG. 7 illustrates another embodiment of a process for adding a signature for a security platform.

In 630, the IoT cloud adds a signature corresponding with the new vulnerability to a security platform. In some embodiments, the IoT cloud adds signatures associated with the category to the security platform. In some embodiments, before adding the signatures, the IoT cloud alerts the customer that the new signature has been identified, and requests authorization to deploy the signatures to the security platform. In some embodiments, the IoT Cloud obtains new signatures from a third party cloud (e.g., an Advanced Threat Prevention Cloud managed by a Security Vendor), FIG. 7 illustrates another embodiment of a process for adding a signature for a security platform. In some embodiments, process 700 is an implementation of operation 440 of FIG. 4 and comprises:

In 710, the IoT cloud determines that a newly identified vulnerability associated with an existing device profile exists.

In 720, the IoT cloud adds a new signature corresponding to the newly identified vulnerability to the security platform. In some embodiments, researchers (e.g., third party researchers, in-house researchers, and/or other researchers) identify new vulnerabilities associated with existing device profiles. When new signatures associated with the new vulnerabilities are made available, the IoT cloud can deploy the new signatures to the security platform. In some embodiments, before deploying the signatures, the IoT cloud alerts the customer that the new signature has been identified, and requests authorization to deploy the signatures to the security platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory; and
   a processor coupled to the memory and configured to:
      monitor network traffic received at a security platform to detect a plurality of IoT device profiles;
      receive a set of signatures for the security platform based on the detected plurality of IoT device profiles;
      add a first signature to the set of signatures for the security platform, comprising to:
         detect a new device profile based on the monitored network traffic;
         determine a category associated with the new device profile, wherein the category includes more than one device profile;
         identify a new vulnerability associated with the category;
         determine that the new vulnerability associated with the new device profile is not stored on the security platform, wherein the first signature is associated with the new vulnerability; and
         in response to a determination that the new vulnerability is not stored on the security platform, add the first signature to the set of signatures for the security platform; and
      send an indication to the security platform to remove signatures associated with at least one category based on a set of policies, wherein the at least one category includes at least two device profiles, and wherein the sending of the indication to the security platform to remove signatures associated with the at least one category comprises to:
  determine that an amount of time that a device profile associated with the at least one category has not been detected within the monitored network traffic is equal to or exceeds a predefined time threshold; and
  in response to a determination that the amount of time that the device profile has not been detected within the monitored network traffic is equal to or exceeds the predefined time threshold:
    mark a second signature associated with the device profile as inactive;
    determine that all signatures associated with the at least one category have been marked inactive; and
    in response to a determination that all the signatures associated with the at least one category have been marked inactive, send the indication to the security platform to remove all the signatures associated with the at least one category.

2. The system of claim 1, wherein the processor is further configured to:
  enforce at least one signature of the set of signatures at the security platform.

3. The system of claim 1, wherein each signature of the set of signatures is mapped to a corresponding IoT device profile.

4. The system of claim 1, wherein the processor is further configured to:
  store a set of vulnerabilities associated with each IoT device profile of the plurality of IoT device profiles in a device threat signature matching data store.

5. The system of claim 1, wherein the set of signatures include signatures for one or more vulnerabilities associated with each IoT device profile of the plurality of IoT device profiles.

6. The system of claim 1, wherein the processor is further configured to:
  determine a difference of signatures between the set of signatures already deployed at the security platform and another set of signatures associated with the plurality of IoT device profiles; and
  add the difference of signatures to the set of signatures.

7. The system of claim 1, wherein the processor is further configured to:
  associate a signature tag with an IoT device profile of the plurality of IoT device profiles.

8. The system of claim 1, wherein the processor is further configured to:
  subscribe, via the security platform, to one or more specific signature tags based on the detected plurality of IoT device profiles.

9. The system of claim 1, wherein an IoT Device profile includes: a device category, a device manufacturer, and a device model.

10. The system of claim 1, wherein the adding of the signature for the security platform comprises to:
  determine that a newly identified vulnerability associated with an existing device profile exists; and
  add a new signature corresponding to the newly identified vulnerability to the security platform.

11. A method, comprising:
  monitoring, using a processor, network traffic received at a security platform to detect a plurality of IoT device profiles;
  receiving, using the processor, a set of signatures for the security platform based on the detected plurality of IoT device profiles;
  add a first signature to the set of signatures for the security platform, comprising:
    detecting a new device profile based on the monitored network traffic;
    determining a category associated with the new device profile, wherein the category includes more than one device profile;
    identifying a new vulnerability associated with the category;
    determining that the new vulnerability associated with the new device profile is not stored on the security platform, wherein the first signature is associated with the new vulnerability; and
    in response to a determination that the new vulnerability is not stored on the security platform, adding the first signature to the set of signatures for the security platform; and
  sending an indication to the security platform to remove signatures associated with at least one category based on a set of policies, wherein the at least one category includes at least two device profiles, and wherein the sending of the indication to the security platform to remove signatures associated with the at least one category comprises:
    determining that an amount of time that a device profile associated with the at least one category has not been detected within the monitored network traffic is equal to or exceeds a predefined time threshold; and
    in response to a determination that the amount of time that the device profile has not been detected within the monitored network traffic is equal to or exceeds the predefined time threshold:
      marking a second signature associated with the device profile as inactive;
      determining that all signatures associated with the at least one category have been marked inactive; and
      in response to a determination that all the signatures associated with the at least one category have been marked inactive, sending the indication to the security platform to remove all the signatures associated with the at least one category.

12. A computer program product comprising: a non-transitory computer readable medium, wherein the computer readable medium comprises computer executable instructions that when executed on a processor perform the following:
  monitoring network traffic received at a security platform to detect a plurality of IoT device profiles;
  receiving a set of signatures for the security platform based on the detected plurality of IoT device profiles;
  add a first signature to the set of signatures for the security platform, comprising:
    detecting a new device profile based on the monitored network traffic;
    determining a category associated with the new device profile, wherein the category includes more than one device profile;

identifying a new vulnerability associated with the category;

determining that the new vulnerability associated with the new device profile is not stored on the security platform, wherein the first signature is associated with the new vulnerability; and in response to a determination that the new vulnerability is not stored on the security platform, adding the first signature to the set of signatures for the security platform; and sending an indication to the security platform to remove signatures associated with at least one category based on a set of policies, wherein the at least one category includes at least two device profiles, and wherein the sending of the indication to the security platform to remove signatures associated with the at least one category comprises:

determining that an amount of time that a device profile associated with the at least one category has not been detected within the monitored network traffic is equal to or exceeds a predefined time threshold; and in response to a determination that the amount of time that the device profile has not been detected within the monitored network traffic is equal to or exceeds the predefined time threshold:

marking a second signature associated with the device profile as inactive;

determining that all signatures associated with the at least one category have been marked inactive; and in response to a determination that all the signatures associated with the at least one category have been marked inactive, sending the indication to the security platform to remove all the signatures associated with the at least one category.

* * * * *